United States Patent
Huang et al.

(10) Patent No.: US 11,800,532 B2
(45) Date of Patent: Oct. 24, 2023

(54) TRI-STATE HYBRID AUTOMATIC REPEAT REQUEST FEEDBACK

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Wei Yang, San Diego, CA (US); Tingfang Ji, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/305,562

(22) Filed: Jul. 9, 2021

(65) Prior Publication Data
US 2022/0022231 A1    Jan. 20, 2022

Related U.S. Application Data

(60) Provisional application No. 62/705,881, filed on Jul. 20, 2020.

(51) Int. Cl.
*H04W 72/12* (2023.01)
*H04L 1/18* (2023.01)
(Continued)

(52) U.S. Cl.
CPC ........... *H04W 72/23* (2023.01); *H04L 1/1812* (2013.01)

(58) Field of Classification Search
CPC ... H04W 28/04; H04W 72/04; H04W 72/042; H04W 88/08; H04W 72/23; H04W 72/1289; H04L 5/0007; H04L 1/1812
(Continued)

(56) References Cited

U.S. PATENT DOCUMENTS 11,563,511 B2 *   1/2023  Xi ..................... H04L 1/1819
2016/0234820 A1 * 8/2016  Mallik ................ H04L 1/1861
(Continued)

FOREIGN PATENT DOCUMENTS

CN    3668 237 A1 *  6/2020  ............ H04W 72/12
EP    2555462 A2     2/2013
(Continued)

OTHER PUBLICATIONS

International Search Report and Written Opinion—PCT/US2021/070863—ISA/EPO—dated Oct. 21, 2021.

*Primary Examiner* — Peter G Solinsky
*Assistant Examiner* — Sanjay K Dewan
(74) *Attorney, Agent, or Firm* — Harrity & Harrity LLP/Qualcomm Incorporated

(57) ABSTRACT

Various aspects of the present disclosure generally relate to wireless communication. In some aspects, a first wireless node may receive one or more communications from a second wireless node, wherein the one or more communications include at least one of: a control channel that schedules a data channel, or the control channel and the data channel; and transmit tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

30 Claims, 6 Drawing Sheets

(51) Int. Cl.
 *H04W 72/23* (2023.01)
 *H04L 1/1812* (2023.01)
(58) Field of Classification Search
 USPC .......................................................... 370/329
 See application file for complete search history.

(56) References Cited

U.S. PATENT DOCUMENTS

2019/0253121 A1\* 8/2019 Islam .................... H04L 1/0026
2019/0313426 A1\* 10/2019 Lin ....................... H04L 1/0009
2022/0116157 A1\* 4/2022 Papasakellariou .... H04L 1/1664

FOREIGN PATENT DOCUMENTS

| EP | 3668237 A1 | 6/2020 | | |
|---|---|---|---|---|
| EP | 3681072 A1 | 7/2020 | | |
| FI | 3 681 072 A1 \* | 7/2020 | ............... | H04L 1/18 |
| KR | 2 555 462 A2 \* | 2/2013 | ............... | H04L 1/18 |
| SE | WO 2018/185638 A1 \* | 10/2018 | ............... | H04L 1/18 |
| WO | 2018204491 A1 | 11/2018 | | |
| WO | WO 2018/204491 A1 \* | 11/2018 | ............... | H04L 1/18 |

\* cited by examiner

2

TRI-STATE HYBRID AUTOMATIC REPEAT REQUEST FEEDBACK

CROSS-REFERENCE TO RELATED APPLICATION

This patent application claims priority to U.S. Provisional Patent Application No. 62/705,881, filed on Jul. 20, 2020, entitled "TRI-STATE HYBRID AUTOMATIC REPEAT REQUEST FEEDBACK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for tri-state hybrid automatic repeat request (HARQ) feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving a communication from a base station, wherein the communication includes at least one of a control channel that schedules a data channel, or the data channel scheduled by the control channel; and transmitting tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, a method of wireless communication performed by a base station includes: transmitting a communication to a UE, wherein the communication includes at least one of a control channel that schedules a data channel, or the data channel scheduled by the control channel; and receiving tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, a user equipment for wireless communication includes: a memory; and one or more processors operatively coupled to the memory, the memory and the one or more processors configured to: receive a communication from a base station, wherein the communication includes at least one of a control channel that schedules a data channel, or the data channel scheduled by the control channel; and transmit tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, a base station for wireless communication includes: a memory; and one or more processors operatively coupled to the memory, the memory and the one or more processors configured to: transmit a communication to a UE, wherein the communication includes at least one of a control channel that schedules a data channel, or the data channel scheduled by the control channel; and receive tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, a non-transitory computer-readable medium storing one or more instructions for wireless communication includes: one or more instructions that, when executed by one or more processors of a user equipment, cause the one or more processors to: receive a communication from a base station, wherein the communication includes at least one of a control channel that schedules a data channel, or the data channel scheduled by the control channel; and transmit tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, a non-transitory computer-readable medium storing one or more instructions for wireless communication includes: one or more instructions that, when executed by one or more processors of a base station, cause the one or more processors to: transmit a communication to a UE, wherein the communication includes at least one of a control channel that schedules a data channel, or the data channel scheduled by the control channel; and receive tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, an apparatus for wireless communication includes: means for receiving a communication from a base station, wherein the communication includes at least one of a control channel that schedules a data channel, or the data channel scheduled by the control channel; and means for transmitting tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, an apparatus for wireless communication includes: means for transmitting a communication to a UE, wherein the communication includes at least one of a control channel that schedules a data channel, or the data channel scheduled by the control channel; and means for receiving tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

In some aspects, a method of wireless communication performed by a first wireless node includes receiving one or more communications from a second wireless node, wherein the one or more communications include at least one of: a control channel that schedules a data channel, or the control channel and the data channel; and transmitting tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

In some aspects, a method of wireless communication performed by a first wireless node includes transmitting one or more communications to a second wireless node, wherein the one or more communications include at least one of: a control channel that schedules a data channel, or the control channel and the data channel; and receiving tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

In some aspects, an apparatus for wireless communication at a first wireless node includes a memory; and one or more processors, coupled to the memory, configured to: receive one or more communications from a second wireless node, wherein the one or more communications include at least one of: a control channel that schedules a data channel, or the control channel and the data channel; and transmit tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

In some aspects, an apparatus for wireless communication at a first wireless node includes a memory; and one or more processors, coupled to the memory, configured to: transmit one or more communications to a second wireless node, wherein the one or more communications include at least one of: a control channel that schedules a data channel, or the control channel and the data channel; and receive tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

In some aspects, a non-transitory computer-readable medium storing a set of instructions for wireless communication includes one or more instructions that, when executed by one or more processors of a first wireless node, cause the first wireless node to: receive one or more communications from a second wireless node, wherein the one or more communications include at least one of: a control channel that schedules a data channel, or the control channel and the data channel; and transmit tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

In some aspects, a non-transitory computer-readable medium storing a set of instructions for wireless communication includes one or more instructions that, when executed by one or more processors of a first wireless node, cause the first wireless node to: transmit one or more communications to a second wireless node, wherein the one or more communications include at least one of: a control channel that schedules a data channel, or the control channel and the data channel; and receive tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

In some aspects, an apparatus for wireless communication includes means for receiving one or more communications from a second wireless node, wherein the one or more communications include at least one of: a control channel that schedules a data channel, or the control channel and the data channel; and means for transmitting tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

In some aspects, an apparatus for wireless communication includes means for transmitting one or more communications to a second wireless node, wherein the one or more communications include at least one of: a control channel that schedules a data channel, or the control channel and the data channel; and means for receiving tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
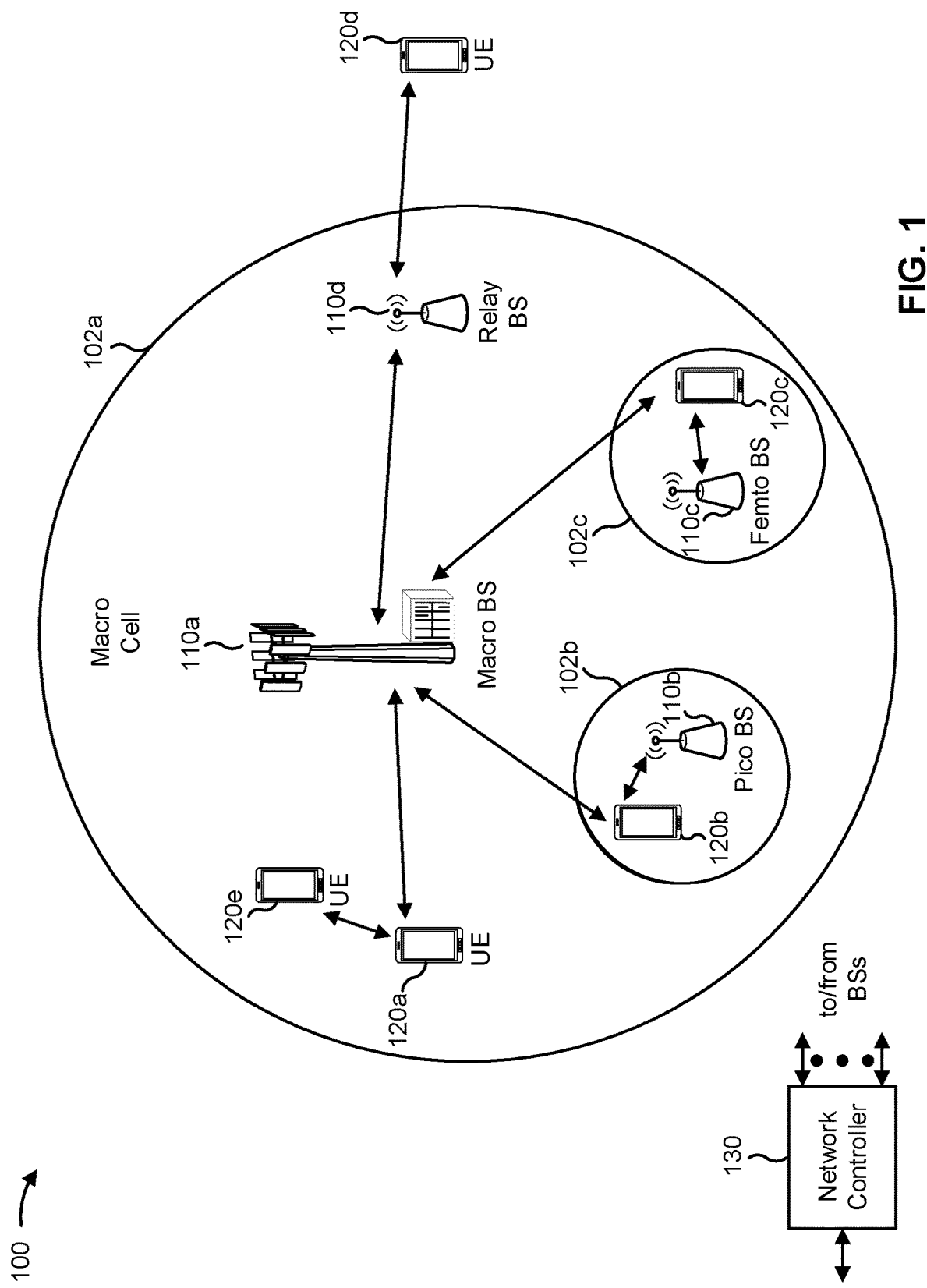
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
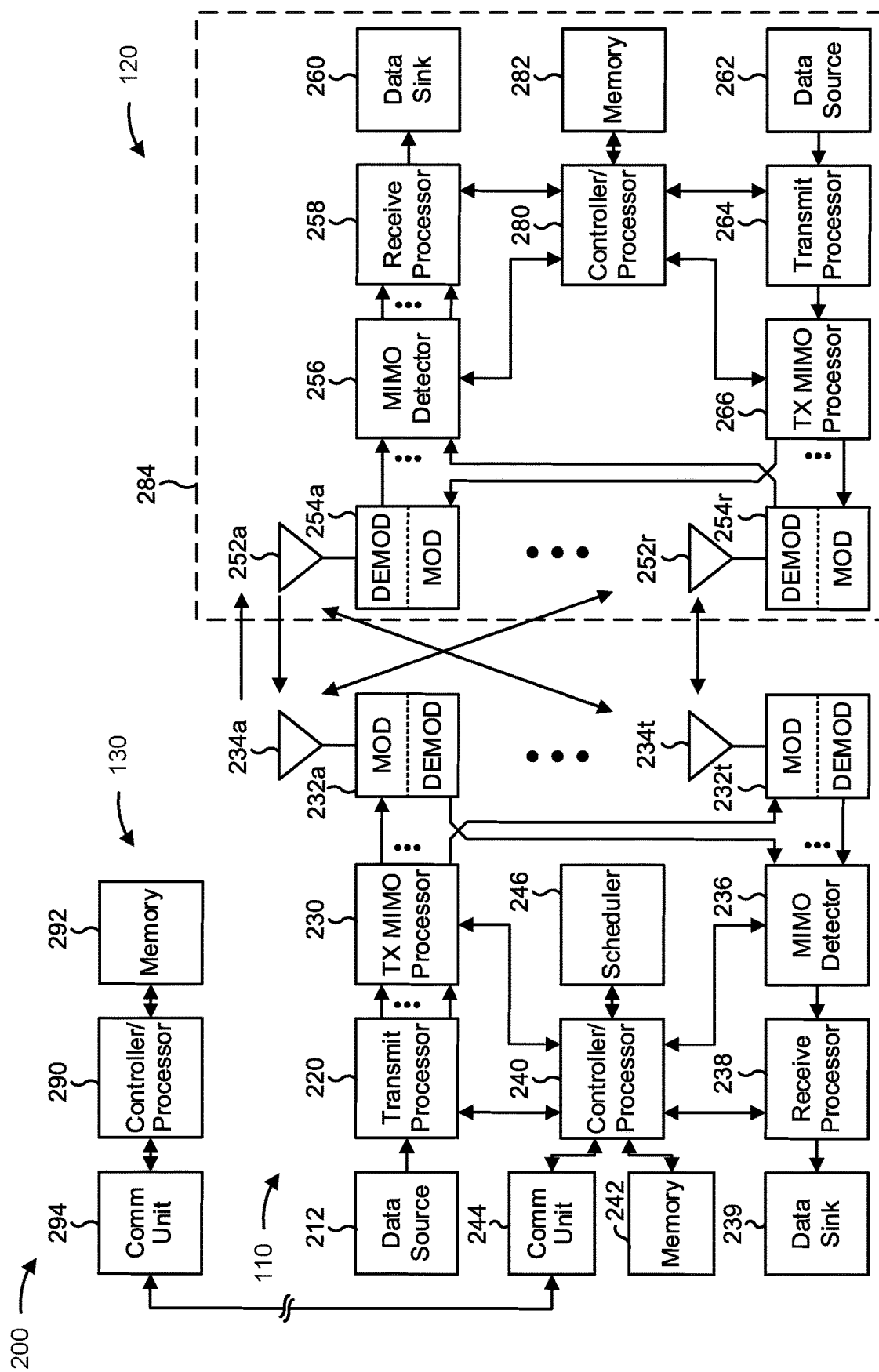
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with tri-state HARQ feedback, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving (e.g., using antenna 252, DEMOD 254, MIMO detector 256, receive processor 258, controller/processor 280, and/or the like) one or more communications from a base station, wherein the one or more communications include at least one of a control channel that schedules a data channel, or the control channel and the data channel; and means for transmitting (e.g., using controller/processor 280, transmit processor 264, TX MIMO processor 266, MOD 254, antenna 252, and/or the like) tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting (e.g., using controller/processor 240, transmit processor 220, TX MIMO processor 230, MOD 232, antenna 234, and/or the like) one or more communications to a UE, wherein the one or more communications include at least one of a control channel that schedules a data channel, or the control channel and the data channel; and means for receiving (e.g., using antenna 234, DEMOD 232, MIMO detector 236, receive processor 238, controller/processor 240, and/or the like) tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A base station may transmit, to a UE, a control channel (e.g., a physical downlink control channel (PDCCH) and/or the like) carrying control information, such as downlink control information (DCI) or uplink control information (UCI). In some cases, DCI may schedule a subsequent data communication, which may be transmitted by the base station on a data channel such as a physical downlink shared channel (PDSCH). The data communication may include a single transport block (TB) or may include multiple code blocks (CBs), referred to as a code block group (CBG).

There are various possible results of receiving the control channel carrying the DCI and the scheduled data communication. For example, the UE may fail to decode the DCI, meaning that the UE is not aware of the scheduled data communication, so reception of the scheduled data communication may fail. As another example, the UE may successfully decode the DCI, then may fail to decode the scheduled data communication. As yet another example, the UE may successfully decode the DCI and the scheduled data communication.

The UE may provide feedback to the base station indicating a result of decoding the control channel and the scheduled data communication. For example, the feedback may include hybrid automatic repeat request (HARQ) feedback, such as a HARQ acknowledgment (HARQ-ACK) or a HARQ negative ACK (HARQ-NACK). HARQ feedback provides a mechanism for triggering retransmission of undecoded transmissions. To provide HARQ feedback, a UE may generate a HARQ codebook that includes values indicating results of receiving TBs or CBGs. For example, the HARQ codebook may include one bit for each TB or CBG that was to be received by the UE. A value may indicate whether or not a data communication corresponding to the TB or CBG was decoded. For example, a positive value (e.g., a first binary value) may indicate that the data communication was decoded, and a negative value (e.g., a second binary value) may indicate that the data communication was not decoded. If the HARQ codebook indicates that a data communication was not decoded, then the base station may retransmit the data communication. In some aspects, the base station may modify a transmission configuration for the data communication, such as by making the data communication more robust, increasing a transmit power, and/or the like, so that the likelihood of reception of the retransmitted data is improved.

However, the usage of binary or two-state HARQ feedback may not provide sufficient information to distinguish whether a failure to receive a data communication is due to a failure to decode the data communication itself (in the case that the corresponding DCI was successfully decoded) or a failure to decode the DCI scheduling the data communication. These two failure cases may be associated with different mitigating actions. For example, if a failure to decode the DCI caused the failure, then the base station can take action to improve the robustness of the control channel (such as boosting a power level of the control channel, changing a beam used to transmit the control channel, or using a larger aggregation level for the control channel), whereas if a failure to decode the data communication caused the failure, then the base station can take action to improve the robustness of the data channel (such as boosting a power level of the data channel, changing a beam used to transmit the data channel, or using a smaller modulation and coding scheme for a retransmission of the data channel). Taking action to improve the robustness of both the data channel and the control channel may involve significant overhead and be wasteful of BS and UE resources, since only one of these is likely to be the cause of the failure.

Techniques and apparatuses described herein provide tri-state HARQ feedback for a data communication. For example, the tri-state HARQ feedback can indicate three results: a first result indicating a failure to decode DCI, a second result indicating successful DCI decoding and a failure to decode a corresponding data communication, and a third result indicating successful decoding of the data communication. By providing tri-state HARQ feedback, a UE may enable a base station to perform a more tailored response to a NACK, since the base station can determine whether the cause of the NACK is associated with a failed DCI reception or a failed PDSCH reception. In this way, utilization of radio resources of the UE and the base station is improved by reducing the likelihood of repeated reception failures.

Figure 3:
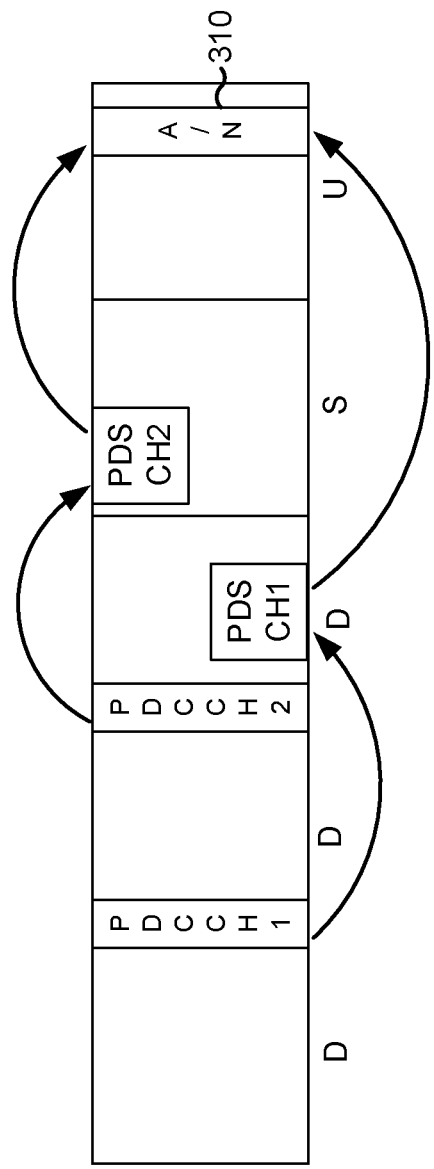
FIG. 3 is a diagram illustrating an example of HARQ feedback for a first physical downlink control channel (PDCCH) and a second PDCCH, in accordance with the present disclosure.

FIG. 3 is a diagram illustrating an example 300 of HARQ feedback for a first PDCCH and a second PDCCH, in accordance with the present disclosure. Example 300 illustrates communications received and transmitted by a UE (e.g., UE 120). Example 300 involves 5 slots, which are denoted by squares: a first three downlink slots, denoted by a "D" under each slot, a special slot denoted by an "S," and an uplink slot denoted by a "U." A UE is expected only to receive communications in a downlink slot, only to transmit communications in an uplink slot, and can receive or transmit communications in a special slot.

As shown, the UE may receive a first PDCCH (e.g., PDCCH1). PDCCH1 may carry DCI that schedules a first data channel (e.g., PDSCH1) in a subsequent slot. As further shown, the UE may receive a second PDCCH (e.g., PDCCH2). PDCCH2 may carry DCI that schedules a second data channel (e.g., PDSCH2) in a subsequent slot. If the UE fails to decode PDCCH1, then the UE may necessarily fail to receive and decode PDSCH1, since the UE would not know of PDSCH1's presence if the UE fails to decode PDSCH1. This scenario may be referred to as a control fail or c-fail. In some cases, the UE successfully decodes PDCCH1 then fails to decode PDSCH1. In other cases, the UE successfully decodes PDCCH1 and PDSCH1. In each of these cases, the UE provides HARQ feedback in the uplink slot, as shown by reference number 310. For example, the UE may generate a HARQ codebook based at least in part on selecting orthogonal sequences from a set of orthogonal sequences, where the orthogonal sequences indicate outcomes of decoding the PDSCH1 and the PDSCH2.

In some aspects, the UE may provide bi-state HARQ feedback. Bi-state HARQ feedback can include an ACK (indicating that the corresponding PDSCH was successfully decoded) or a NACK (indicating that the corresponding PDSCH was not successfully decoded. However, a NACK may not indicate whether the UE failed to decode the corresponding PDSCH due to a control fail (e.g., a failure to decode the PDCCH that schedules the corresponding PDSCH) or due to a failure to decode the corresponding PDSCH itself after successfully decoding the PDCCH. A failure to decode the corresponding PDSCH itself after successfully decoding the PDCCH may be referred to herein as a true NACK.

Techniques and apparatuses described herein provide for the UE to transmit tri-state HARQ feedback. Tri-state HARQ feedback is feedback that distinguishes between a failure to decode a PDSCH due to a failure to decode the PDCCH that schedules the PDSCH, and a failure to decode the PDSCH after successfully decoding the PDCCH that schedules the PDSCH. For example, tri-state HARQ feedback may be associated with three potential states: a first state to indicate a control fail, a second state to indicate a true NACK, and a third state to indicate an ACK. In example 300, the tri-state HARQ feedback may indicate whether PDSCH1 was successfully decoded, PDCCH1 was successfully decoded and PDSCH1 was not successfully decoded, or PDCCH1 was not successfully decoded (and similarly for PDSCH2 and PDCCH2). Based at least in part on tri-state HARQ feedback, a base station can perform more appropriate tasks to improve a retransmission, in comparison to bi-state HARQ feedback. For example, the base station can determine whether the failure to decode the PDSCH is caused by a control fail or a true NACK, and therefore can selectively modify the PDCCH or the PDSCH to improve the likelihood of successful reception without unduly increasing overhead and reducing throughput.

As a first example, suppose the UE 120 fails to decode a PDCCH 1 and successfully decodes a PDCCH 2. Based on a total downlink assignment index (DAI) field in the PDCCH 2, the UE 120 may determine that the BS 110, in total, scheduled 2 PDSCHs. Thus, the UE 120 may feed back two bits in the HARQ-ACK following the total DAI. Suppose further that the UE 120 also successfully decoded the second PDSCH (corresponding to the PDCCH 2). Using tri-state HARQ feedback, the 120 UE can feedback a codebook indicating {control fail, ACK} where the first entry is feedback for the first DL transmission (e.g., the PDCCH 1) and the second entry is feedback for the second DL transmission (e.g., the PDCCH 2 and the second PDSCH. Comparatively, with bi-state HARQ feedback, the UE 120 may feedback a codebook indicating {NACK, ACK} in this scenario.

As a second example, suppose the UE 120 fails to decode the PDCCH 1 and successfully decodes the PDCCH 2. In this case, based at least in part on the total DAI field in PDCCH 2, the UE 120 may determine that the BS 110, in total, scheduled 2 PDSCHs (e.g., transmitted 2 PDCCHs), and the UE 120 may thus feedback two bits in the HARQ-ACK feedback in accordance with the total DAI. If the UE 120 failed to decode the second PDSCH, using tri-state HARQ feedback, the UE 120 may feedback a codebook indicating {control fail, NACK}, where the first entry is feedback for the first DL transmission and the second entry is feedback for the second DL transmission. However, with bi-state feedback, the UE 120 may feedback a codebook indicating {NACK, NACK}.

In some aspects, tri-state HARQ feedback may be useful in a beam-based communication system, such as a communication system operating in FR2 or Frequency Range 4 (FR4), where FR4 covers approximately 52.6 GHz to 71 GHz. For example, suppose that a BS 110 does not know which beam should be used to transmit a PDCCH to a UE 120. Then, the BS 110 may use PDCCH 1 to schedule PDSCH 1. The BS 110 may transmit PDCCH 1 with beam 1 (for example, the BS 110 may transmit the PDCCH 1 with PDCCH transmission configuration indicator (TCI)/quasi-colocation (QCL) state 1). The BS 110 may use PDCCH 2 to schedule PDSCH 2, and may transmit PDCCH 2 with beam 2 (e.g., as PDCCH TCI/QCL state 2). Suppose that, at the UE 120, decoding of PDCCH 1 and PDCCH 2 was decoded successfully, but decoding of PDSCH 2 failed. With tri-state HARQ feedback, the UE 120 may feed back {control fail, NACK}. Based at least in part on this feedback, the BS 110 can determine that PDCCH 1 failed and PDCCH 2 succeeded. Then, the BS 110 can determine that beam 2 is better than beam 1 for transmission of the PDCCH. Thus, the BS 110 may use beam 2 for future PDCCH transmissions to schedule future PDSCH transmissions and retransmissions. In summary, a control failure can serve as a beam indicator/feedback to tell a BS 110 which beam for PDCCH is good and/or which beam for PDCCH is bad. Furthermore, the BS 110 can identify or calibrate other qualities of PDCCH transmission based at least in part on this feedback, such as aggregation level, PDCCH Tx power, and so on.

As indicated above, FIG. 3 is provided as an example. Other examples may differ from what is described with regard to FIG. 3.

Figure 4:
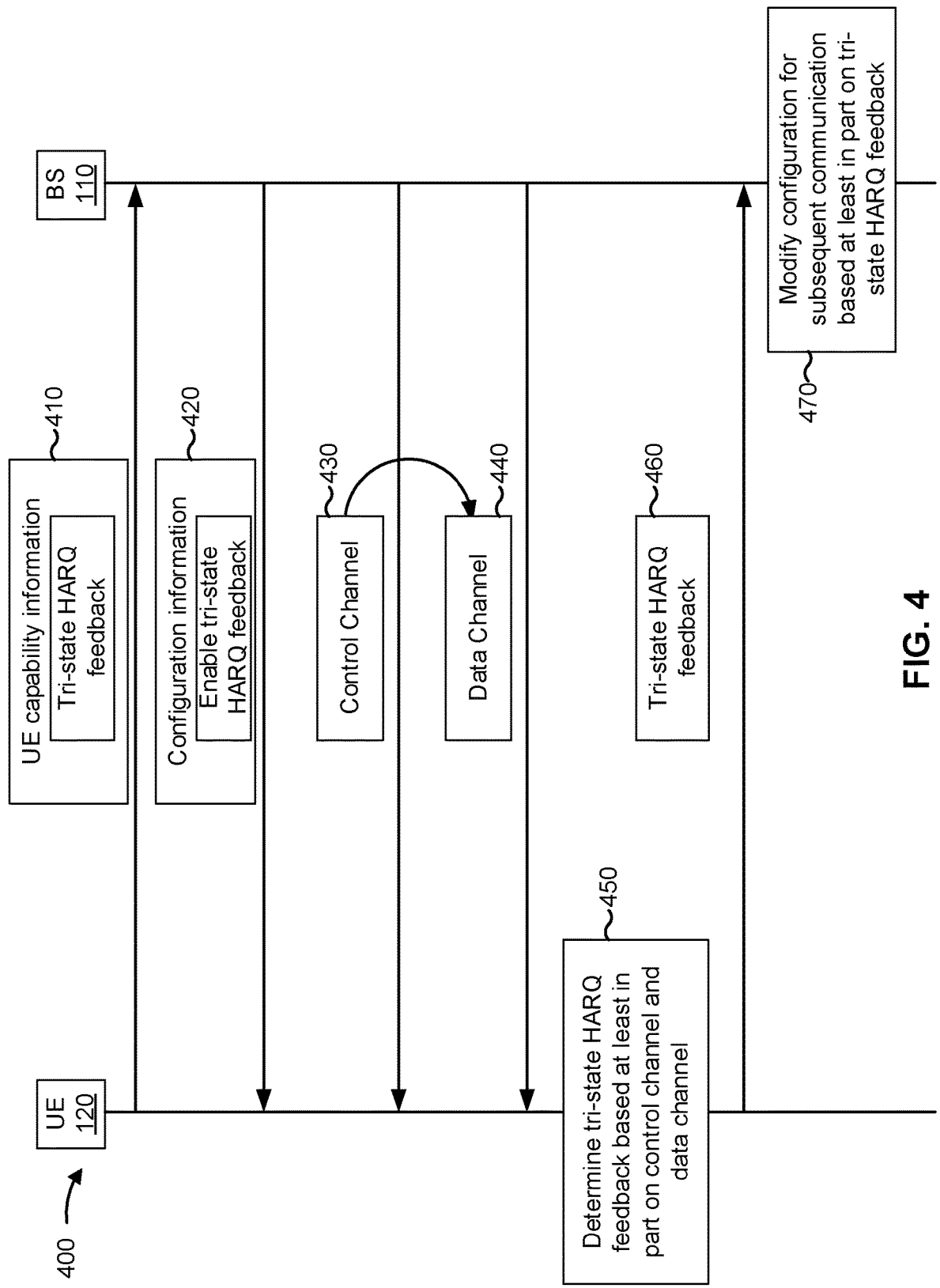
FIG. 4 is a diagram illustrating an example of signaling associated with tri-state HARQ feedback, in accordance with the present disclosure.

FIG. 4 is a diagram illustrating an example 400 of signaling associated with tri-state HARQ feedback, in accordance with the present disclosure. As shown, example 400 includes a UE 120 and a BS 110.

As shown in FIG. 4, and by reference number 410, the UE 120 may transmit UE capability information to the BS 110. For example, the UE capability information may indicate whether the UE 120 is capable of determining and providing tri-state HARQ feedback. In some aspects, the UE capability information may indicate one or more parameters associated with the tri-state HARQ feedback, such as a minimum processing timeline for determining and/or providing tri state HARQ feedback and/or the like.

As shown by reference number 420, the BS 110 may transmit configuration information to the UE 120. The configuration information may indicate to enable tri-state HARQ feedback at the UE 120. For example, the BS 110 may configure the UE 120 (e.g., via radio resource control (RRC) signaling and/or the like) to determine and transmit tri-state HARQ feedback. In some aspects, the configuration to provide tri-state HARQ feedback may be at a per-UE granularity. For example, the BS 110 may configure a first UE to transmit tri-state HARQ feedback and may configure a second UE to transmit bi-state HARQ feedback. In some aspects, the configuration to provide tri-state HARQ feedback may be at a per-component carrier (CC) granularity. For example, the BS 110 may configure the UE 120 to transmit tri-state HARQ feedback on a first CC and to transmit bi-state HARQ feedback on a second CC. In such a case, the UE 120 may transmit tri-state HARQ feedback and bi-state HARQ feedback in a same HARQ codebook.

In some aspects, the configuration information may indicate a condition for determining tri-state HARQ feedback. For example, the condition may indicate that the UE 120 is to determine tri-state HARQ feedback if the UE 120 is configured with a HARQ codebook for ultra-reliable low-latency communication (URLLC), and to determine bi-state HARQ feedback otherwise (e.g., if the UE 120 is configured with a HARQ codebook for enhanced mobile broadband (eMBB) communication). As another example, the condition may indicate that the UE 120 is to determine tri-state HARQ feedback if a high-reliability block error rate (BLER) table, such as a BLER table with a $10^{-4}$ BLER threshold is used to determine a modulation and coding scheme (MCS) or channel quality indicator (CQI) for the PDSCH. As a third example, the condition may indicate that the UE 120 is to determine tri-state HARQ feedback only if a code block group (CBG) based PDSCH is not configured (e.g., the UE 120 is to determine tri-state HARQ feedback if a transport block (TB) based PDSCH is configured).

As shown by reference number 430, the BS 110 may transmit a control channel (e.g., a PDCCH) to the UE 120. As indicated by the curved arrow, the control channel may schedule a data channel shown by reference number 440. The UE 120 may attempt to decode the control channel. If the UE 120 successfully decodes the control channel and determines that the data channel is scheduled, then the UE 120 may attempt to decode the data channel. In some aspects, the control channel and the data channel may be associated with a millimeter wave frequency range, such as FR2 or Frequency Range 4. As shown by reference number 450, the UE 120 may determine tri-state HARQ feedback based at least in part on attempting to decode the control channel and the data channel. For example, the UE 120 may generate tri-state HARQ feedback indicating a control fail (e.g., if the UE 120 failed to decode the control channel shown by reference number 430), a true NACK (e.g., if the UE 120 successfully decoded the control channel and failed to decode the data channel shown by reference number 440), or an ACK (e.g., if the UE 120 successfully decoded the data channel). In some aspects, the UE 120 may selectively generate bi-state HARQ feedback or tri-state HARQ feedback, for example, based at least in part on one or more of the conditions described in connection with reference number 420. As shown by reference number 460, the UE 120 may transmit the tri-state HARQ feedback (such as on a physical uplink control channel (PUCCH) and/or via uplink control information). In some aspects, the UE 120 may transmit bi-state HARQ feedback (if determined), multi-state HARQ feedback (such as associated with HARQ feedback for a CBG based PDSCH), or a combination of bi-state, tri-state, and/or multi-state HARQ feedback.

In some aspects, the UE 120 may selectively generate bi-state HARQ feedback or tri-state HARQ feedback based at least in part on how many TBs or PDSCHs are scheduled by a control channel. For example, in some cases, the UE 120 may receive multiple control channels scheduling multiple TBs or PDSCHs. In this case, the UE 120 may transmit tri-state HARQ feedback only if there are multiple TBs or PDSCHs to be acknowledged in a HARQ-ACK codebook. The UE 120 may use bi-state HARQ feedback if a single TB or PDSCH is to be acknowledged in a HARQ-ACK codebook. This may resolve ambiguity with regard to whether the UE 120 has missed a PDCCH in the case of the single TB or PDSCH, since the UE 120 cannot determine whether a second PDCCH has been missed in the case of a single TB or PDSCH.

In some aspects, the UE 120 may generate the tri-state HARQ feedback based at least in part on an exponential expression with base 3 (e.g., $3^K$, where K is a size of a physical uplink control channel (PUCCH) payload to carry the tri-state HARQ feedback). For example, the tri-state HARQ feedback may be based at least in part on a trinary (e.g., ternary) system, whereas bi-state HARQ feedback may be based at least in part on a binary system. In some aspects, the tri-state HARQ feedback may be generated based at least in part on a sequence-based PUCCH. A sequence-based PUCCH may be based at least in part on a plurality of orthogonal sequences. For example, the UE 120 and/or the BS 110 may generate N*M orthogonal sequences (e.g., codepoints) based at least in part on a Kronecker product of a discrete Fourier transform (DFT) of n and S (at cyclic shift (CS) index m), (e.g., DFT(n)*S (CS index m)), for n=0, 1, . . . , N−1 and m=0, 1, . . . , M−1. N may represent the number of OFDM symbols, M may represent the number of tones, and S is a cell specific low-peak to average power ratio (PAPR) sequence with length M. Supposing a PUCCH payload size=K, a codebook with size $3^K$ may be generated by selecting $3^K$ codepoints from the above N*M orthogonal codepoints/sequences. To transmit a payload of K trits (trinary digits), say $t_0 t_1 t_2 \ldots t_{K-1}$, the UE 120 may convert the payload ternary stream $t_0 t_1 t_2 \ldots t_{K-1}$ into a decimal number k, then may transmit the kth codepoint in the constructed codebook.

The selection of the sequences may be based at least in part on independent selection (where the DFT index and the CS index corresponding to the sequences are selected independently from each other) or joint selection (where the DFT index and the CS index are selected jointly with one another). For independent selection, consider a PUCCH payload size of K, leading to a codebook size of $3^K$. In this case, the BS 110 may signal, to the UE 120, two values K1 and K2, where K1+K2=K. K1 and K2 may indicate a payload partition between the DFT domain and the CS domain. The UE 120 may select $N1=3^{K1}$ DFT row/column indices from a [0, 1, . . . , N−1] DFT matrix (where $N1=3^{K1} \leq N$), with a largest possible circular gap among selected indices, to combat channel Doppler shift. The UE 120 may further select $M2=3^{K2}$ CS indices from [0, 1, . . . , M−1] CS indices applied on S (where $M2=3^{K2} \leq M$), with a largest possible circular gap among selected indices, to combat channel delay spread. For joint selection, consider DFT row/column indices of n=0, 1, 2, . . . , N−1 and CS indices of m=0, 1, 2, . . . , M−1. In this case, a set of joint indices j can be constructed based on the above two indices. For example, j=n*M+m or j=m*N+n, where j=0, 1, 2, . . . , M*N−1. The UE 120 may select a subset of $3^K$ indices from {j=0, 1, 2, . . . , M*N−1}, where K is the payload size. The selection of the subset may be from a starting index j_start, and with an offset j_offset, to pick the indices from the full set {j=0, 1, 2, . . . , M*N−1}, where j_start is signaled by a BS 110, and j_offset can be derived by the UE 120 based on j_offset=floor($M*N/(3^K)$), or signaled by the BS 110.

In some aspects, the UE 120 may determine and transmit HARQ feedback for a CBG based PDSCH. A CBG based PDSCH may include multiple CBGs scheduled by a PDCCH. The UE 120 may provide HARQ feedback for each CBG. Thus, if the UE 120 is to provide feedback indicating whether control failure has occurred for X CBGs, the UE 120 may generate $2^X+1$ HARQ feedback states, corresponding to a pair of ACK/NACK states for each CBG ($2^X$ states) and a state indicating control failure (1 state). If the UE 120 generates HARQ feedback using the sequence based PUCCH, the UE 120 may map the $2^X+1$ states to $2^X+1$ sequence indices with a one-to-one mapping between states and sequences. For example, the UE 120 may map the control fail state to a sequence 0. The UE 120 may then map other states, such as $b_0 b_1 b_2 \ldots b_{X-1}$, by converting $b_0 b_1 b_2 \ldots b_{X-1}$ into an integer L, then mapping L to the (L+1)-th sequence (i.e., sequence L plus 1) in the sequence codebook (as the initial sequence is already used for the control fail state). Thus, the UE 120 may reduce latency associated with CBG based feedback and may enable control fail indication in HARQ feedback for the CBG based PDSCH.

As shown by reference number 470, in some aspects, the BS 110 may modify a configuration for a subsequent communication based at least in part on the tri-state HARQ feedback. For example, the BS 110 may modify a code rate, a transmission configuration indicator state, a transmit power, and/or the like, for the subsequent communication. The subsequent communication may include a retransmission of the control channel or the data channel, or may be a different transmission than the control channel or the data channel. As a particular example, consider a communication in FR2. In a case where the BS 110 transmits PDCCH1 using beam 1 and PDCCH2 using beam 2, if the UE 120 provides tri-state HARQ feedback indicating a control fail for PDCCH1 and a true NACK for PDCCH2, then the BS 110 may determine that beam 1 is worse than beam 2, and may use beam 2 to transmit a PDCCH to schedule retransmission of PDSCH1 corresponding to PDCCH1. Thus, the tri-state HARQ feedback indicator can be considered an implicit beam feedback indicator.

Figure 5:
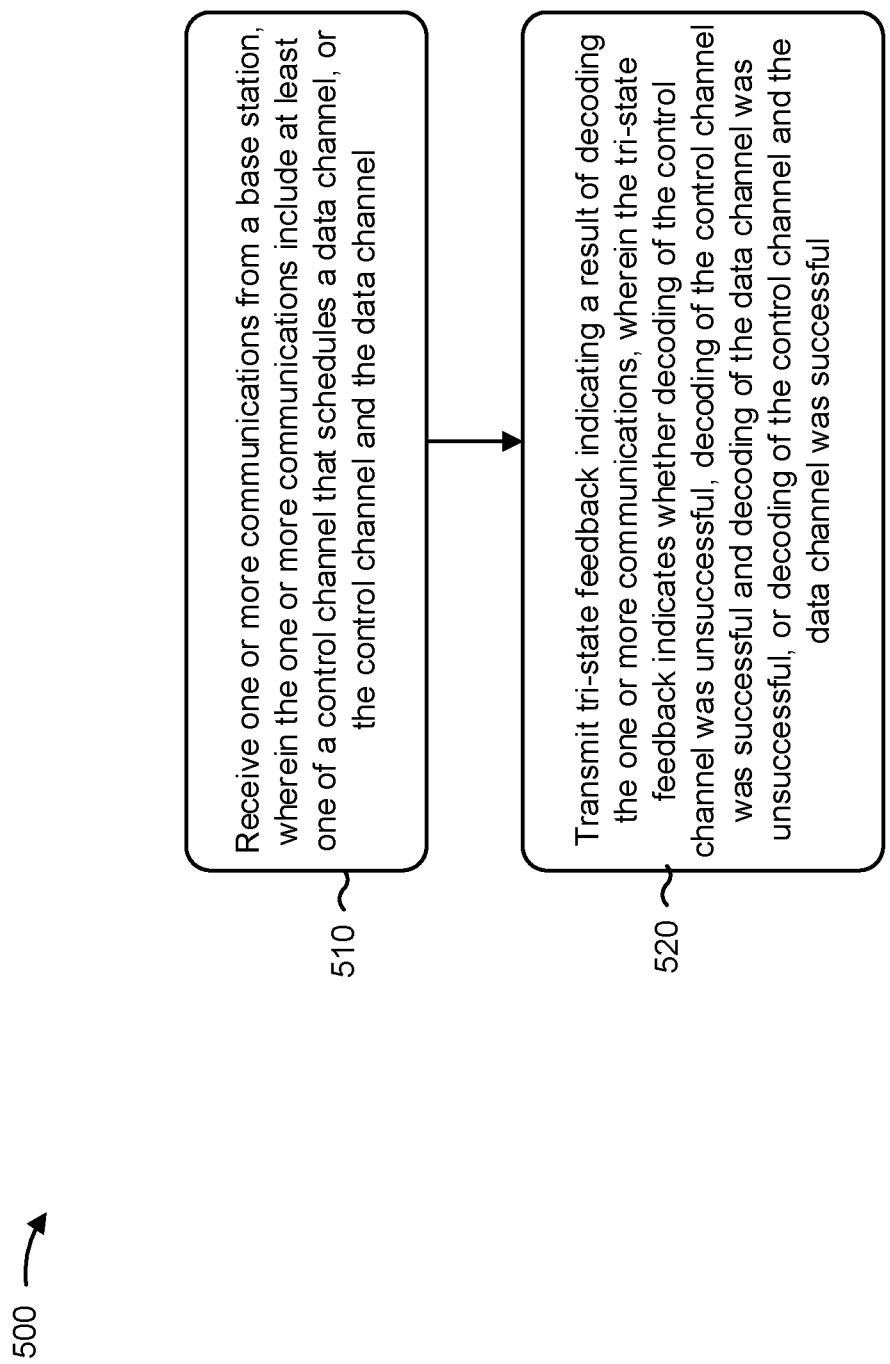
FIGS. 5-6 are diagrams illustrating example processes associated with tri-state HARQ feedback, in accordance with the present disclosure.

FIG. 5 is a diagram illustrating an example process 500 performed, for example, by a first wireless node, in accordance with the present disclosure. Example process 500 is an example where the first wireless node (e.g., UE 120, BS 110, and/or the like) performs operations associated with tri-state HARQ feedback.

As shown in FIG. 5, in some aspects, process 500 may include receiving one or more communications from a second wireless node, wherein the one or more communications include at least one of a control channel that schedules a data channel, or the control channel and the data channel (block 510). For example, the first wireless node (e.g., using antenna 252, DEMOD 254, MIMO detector 256, receive processor 258, controller/processor 280, and/or the like) may receive one or more communications from a second wireless node, as described above, for example, with reference to FIGS. 3 and 4. In some aspects, the one or more communications include at least one of a control channel that schedules a data channel, or the data channel scheduled by the control channel.

As further shown in FIG. 5, in some aspects, process 500 may include transmitting tri-state feedback indicating a result of decoding the one or more communication, wherein the tri-state feedback indicates whether decoding of the control channel was unsuccessful, decoding of the control channel was successful and decoding of the data channel was unsuccessful, or decoding of the control channel and the data channel was successful (block 520). For example, the first wireless node (e.g., using controller/processor 280, transmit processor 264, TX MIMO processor 266, MOD 254, antenna 252, and/or the like) may transmit tri-state feedback indicating a result of decoding the communication, as described above, for example, with reference to FIGS. 3 and/or 4. In some aspects, the tri-state feedback indicates whether decoding of the control channel was unsuccessful, decoding of the control channel was successful and decoding of the data channel was unsuccessful, or decoding of the control channel and the data channel was successful.

Process 500 may include additional aspects, such as any single aspect or any combination of aspects described below and/or in connection with one or more other processes described elsewhere herein.

In a first aspect, process 500 includes transmitting capability information indicating that the first wireless node supports the tri-state feedback, and receiving configuration information indicating to provide the tri-state feedback.

In a second aspect, alone or in combination with the first aspect, at least one of the capability information or the configuration information is specific to a downlink component carrier (CC).

In a third aspect, alone or in combination with one or more of the first and second aspects, at least one of the capability information or the configuration information is specific to the first wireless node.

In a fourth aspect, alone or in combination with one or more of the first through third aspects, transmitting the tri-state feedback is based at least in part on the tri-state feedback being generated using an ultra-reliable low-latency communication (URLLC) feedback codebook.

In a fifth aspect, alone or in combination with one or more of the first through fourth aspects, transmitting the tri-state feedback is based at least in part on a high-reliability block error rate (BLER) table being used to determine a modulation and coding scheme (MCS) or channel quality indicator (CQI) associated with the data channel.

In a sixth aspect, alone or in combination with one or more of the first through fifth aspects, transmitting the tri-state feedback is based at least in part on the one or more communications being associated with a single transport block.

In a seventh aspect, alone or in combination with one or more of the first through sixth aspects, transmitting the tri-state feedback is based at least in part on the one or more communications being configured without a code block group (CBG) based shared channel.

In an eighth aspect, alone or in combination with one or more of the first through seventh aspects, transmitting the tri-state feedback is based at least in part on the one or more communications including multiple transport blocks or multiple shared channels.

In a ninth aspect, alone or in combination with one or more of the first through eighth aspects, the one or more communications are a first communication, and the process 500 further comprises: transmitting bi-state feedback based at least in part on a second communication including a single transport block or a single shared channel, wherein the bi-state feedback indicates whether decoding of a data channel of the second communication was successful or unsuccessful.

In a tenth aspect, alone or in combination with one or more of the first through ninth aspects, the tri-state feedback is generated based at least in part on a codebook generated based at least in part on a plurality of orthogonal sequences, wherein the codebook is generated based at least in part on an exponential expression with base 3.

In an eleventh aspect, alone or in combination with one or more of the first through tenth aspects, process 500 includes generating the tri-state feedback using the codebook based at least in part on converting a set of ternary feedback values to a decimal value and selecting a codeword from the codebook based at least in part on the decimal value.

In a twelfth aspect, alone or in combination with one or more of the first through eleventh aspects, the one or more communications are received on a CBG based data channel including one or more CBGs, and the tri-state feedback includes a bi-state feedback value for each CBG of the one or more CBGs indicating whether decoding of each CBG was successful or unsuccessful, and a feedback value indicating whether decoding of the control channel was successful or unsuccessful, wherein the control channel is associated with the one or more CBGs.

In a thirteenth aspect, alone or in combination with one or more of the first through twelfth aspects, process 500 includes mapping the bi-state feedback value and the feedback value to corresponding sequence indices of a plurality of orthogonal sequences of a codebook.

In a fourteenth aspect, alone or in combination with one or more of the first through thirteenth aspects, the communication is associated with a millimeter wave frequency range.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
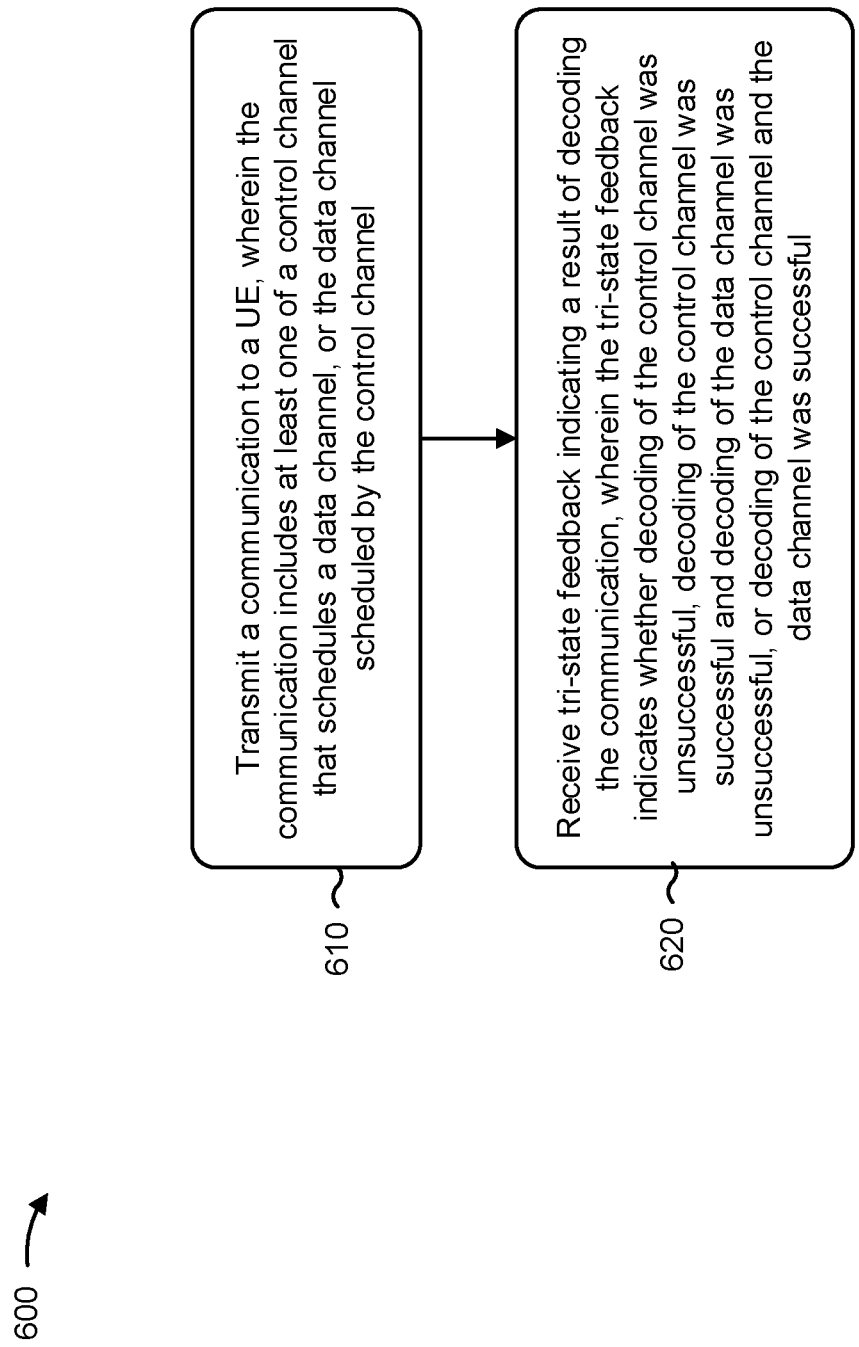

FIG. 6 is a diagram illustrating an example process 600 performed, for example, by a first wireless node, in accordance with the present disclosure. Example process 600 is an example where the first wireless node (e.g., base station 110, UE 120, the second wireless node of FIG. 5, and/or the like) performs operations associated with tri-state HARQ feedback.

As shown in FIG. 6, in some aspects, process 600 may include transmitting one or more communications to a second wireless node, wherein the one or more communications include at least one of a control channel that schedules a data channel, or the control channel and the data channel (block 610). For example, the first wireless node (e.g., using controller/processor 240, transmit processor 220, TX MIMO processor 230, MOD 232, antenna 234, and/or the like) may transmit one or more communications to a UE, as described above, for example, with reference to FIGS. 3 and/or 4. In some aspects, the one or more communications include at least one of a control channel that schedules a data channel, or the control channel and the data channel.

As further shown in FIG. 6, in some aspects, process 600 may include receiving tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful (block 620). For example, the first wireless node (e.g., using antenna 234, DEMOD 232, MIMO detector 236, receive processor 238, controller/processor 240, and/or the like) may receive tri-state feedback indicating a result of decoding the one or more communications, as described above, for example, with reference to FIGS. 3 and/or 4. In some aspects, the tri-state feedback indicates whether decoding of the control channel was unsuccessful, decoding of the control channel was successful and decoding of the data channel was unsuccessful, or decoding of the control channel and the data channel was successful.

Process 600 may include additional aspects, such as any single aspect or any combination of aspects described below and/or in connection with one or more other processes described elsewhere herein.

In a first aspect, the one or more communications are a first communication, and process 600 includes transmitting a second communication using a modified control channel configuration relative to the first communication based at least in part on the tri-state feedback indicating that decoding of the control channel was unsuccessful.

In a second aspect, alone or in combination with the first aspect, the modified control channel configuration is based at least in part on feedback indicating that decoding of another control channel, transmitted using the modified control channel configuration, was successful.

In a third aspect, alone or in combination with one or more of the first and second aspects, process 600 includes receiving capability information indicating that the UE supports tri-state feedback, and transmitting configuration information indicating to provide the tri-state feedback.

In a fourth aspect, alone or in combination with one or more of the first through third aspects, at least one of the capability information or the configuration information is specific to a downlink CC.

In a fifth aspect, alone or in combination with one or more of the first through fourth aspects, at least one of the capability information or the configuration information is specific to the UE.

In a sixth aspect, alone or in combination with one or more of the first through fifth aspects, transmitting the tri-state feedback is based at least in part on the tri-state feedback being generated using a URLLC feedback codebook.

In a seventh aspect, alone or in combination with one or more of the first through sixth aspects, the tri-state feedback is based at least in part on a high-reliability BLER table being used to determine an MCS or CQI associated with the data channel.

In an eighth aspect, alone or in combination with one or more of the first through seventh aspects, the tri-state feedback is based at least in part on the one or more communications being associated with a single transport block.

In a ninth aspect, alone or in combination with one or more of the first through eighth aspects, the tri-state feedback is based at least in part on the one or more communications being configured without a CBG based shared channel.

In a tenth aspect, alone or in combination with one or more of the first through ninth aspects, the tri-state feedback is based at least in part on the one or more communications including multiple transport blocks or multiple shared channels.

In an eleventh aspect, alone or in combination with one or more of the first through tenth aspects, the one or more communications are a first communication, and the process 500 further comprises: receiving bi-state feedback based at least in part on a second communication including a single transport block or a single shared channel, wherein the bi-state feedback indicates whether decoding of a data channel of the second communication was successful or unsuccessful.

In a twelfth aspect, alone or in combination with one or more of the first through eleventh aspects, the tri-state feedback is based at least in part on a codebook generated based at least in part on a plurality of orthogonal sequences, wherein the codebook is generated based at least in part on an exponential expression with base 3.

In a thirteenth aspect, alone or in combination with one or more of the first through twelfth aspects, process 600 includes processing the tri-state feedback using the codebook based at least in part on converting a set of ternary feedback values to a decimal value and selecting a codeword from the codebook based at least in part on the decimal value.

In a fourteenth aspect, alone or in combination with one or more of the first through thirteenth aspects, the one or more communications are transmitted on a CBG based data channel including one or more CBGs, and the tri-state feedback includes: a bi-state feedback value for each CBG of the one or more CBGs indicating whether decoding of each CBG was successful or unsuccessful, and a feedback value indicating whether decoding of the control channel was successful or unsuccessful, wherein the control channel is associated with the one or more CBGs.

In a fifteenth aspect, alone or in combination with one or more of the first through fourteenth aspects, process 600 includes mapping the bi-state feedback value and the feedback value to corresponding sequence indices of a plurality of orthogonal sequences of a codebook.

In a sixteenth aspect, alone or in combination with one or more of the first through fifteenth aspects, the one or more communications are associated with a millimeter wave frequency range.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a first wireless node, comprising: receiving one or more communications from a second wireless node, wherein the one or more communications include at least one of: a control channel that schedules a data channel, or the control channel and the data channel; and transmitting tri-state feedback indicating a result of decoding the communication, wherein the tri-state feedback indicates whether decoding of the control channel was unsuccessful, decoding of the control channel was successful and decoding of the data channel was unsuccessful, or decoding of the control channel and the data channel was successful.

Aspect 2: The method of Aspect 1, further comprising: transmitting capability information indicating that the first wireless node supports the tri-state feedback; and receiving configuration information indicating to provide the tri-state feedback.

Aspect 3: The method of Aspect 2, wherein at least one of the capability information or the configuration information is specific to a downlink component carrier (CC).

Aspect 4: The method of Aspect 2, wherein at least one of the capability information or the configuration information is specific to the first wireless node.

Aspect 5: The method of any of Aspects 1-4, wherein transmitting the tri-state feedback is based at least in part on the tri-state feedback being generated using an ultra-reliable low-latency communication (URLLC) feedback codebook.

Aspect 6: The method of any of Aspects 1-5, wherein transmitting the tri-state feedback is based at least in part on a high-reliability block error rate (BLER) table being used to determine a modulation and coding scheme (MCS) or channel quality indicator (CQI) associated with the data channel.

Aspect 7: The method of any of Aspects 1-6, wherein transmitting the tri-state feedback is based at least in part on the one or more communications being associated with a single transport block.

Aspect 8: The method of any of Aspects 1-7, wherein transmitting the tri-state feedback is based at least in part on the one or more communications being configured without a code block group (CBG) based shared channel.

Aspect 9: The method of any of Aspects 1-8, wherein transmitting the tri-state feedback is based at least in part on the one or more communications including multiple transport blocks or multiple shared channels.

Aspect 10: The method of Aspect 9, wherein the one or more communications are a first communication, and wherein the method further comprises: transmitting bi-state feedback based at least in part on a second communication including a single transport block or a single shared channel, wherein the bi-state feedback indicates whether decoding of a data channel of the second communication was successful or unsuccessful.

Aspect 11: The method of any of Aspects 1-10, wherein the tri-state feedback is generated based at least in part on a codebook generated based at least in part on a plurality of orthogonal sequences, wherein the codebook is generated based at least in part on an exponential expression with base 3.

Aspect 12: The method of Aspect 11, further comprising: generating the tri-state feedback using the codebook based at least in part on converting a set of ternary feedback values to a decimal value and selecting a codeword from the codebook based at least in part on the decimal value.

Aspect 13: The method of any of Aspects 1-12, wherein the one or more communications are received on a code block group (CBG) based data channel including one or more CBGs, and wherein the tri-state feedback includes: a bi-state feedback value for each CBG of the one or more CBGs indicating whether decoding of each CBG was successful or unsuccessful, and a feedback value indicating whether decoding of the control channel was successful or unsuccessful, wherein the control channel is associated with the one or more CBGs.

Aspect 14: The method of Aspect 13, further comprising: mapping the bi-state feedback value and the feedback value to corresponding sequence indices of a plurality of orthogonal sequences of a codebook.

Aspect 15: A method of wireless communication performed by a first wireless node, comprising: transmitting one or more communications to a second wireless node, wherein the one or more communications include at least one of: a control channel that schedules a data channel, or the control channel and the data channel; and receiving tri-state feedback indicating a result of decoding the one or more communications, wherein the tri-state feedback indicates whether decoding of the control channel was unsuccessful, decoding of the control channel was successful and decoding of the data channel was unsuccessful, or decoding of the control channel and the data channel was successful.

Aspect 16: The method of Aspect 15, wherein the one or more communications are a first communication and the tri-state feedback indicates that decoding of the control channel was unsuccessful, and wherein the method further comprises: transmitting a second communication using a modified control channel configuration relative to the first communication based at least in part on the tri-state feedback indicating that decoding of the control channel was unsuccessful.

Aspect 17: The method of Aspect 16, wherein the modified control channel configuration is based at least in part on feedback indicating that decoding of another control channel, transmitted using the modified control channel configuration, was successful.

Aspect 18: The method of any of Aspects 15-17, further comprising: receiving capability information indicating that the second wireless node supports tri-state feedback; and transmitting configuration information indicating to provide the tri-state feedback.

Aspect 19: The method of Aspect 18, wherein at least one of the capability information or the configuration information is specific to a downlink component carrier (CC).

Aspect 20: The method of Aspect 18, wherein at least one of the capability information or the configuration information is specific to the second wireless node.

Aspect 21: The method of any of Aspects 15-20, wherein transmitting the tri-state feedback is based at least in part on the tri-state feedback being generated using an ultra-reliable low-latency communication (URLLC) feedback codebook.

Aspect 22: The method of any of Aspects 15-21, wherein the tri-state feedback is based at least in part on a high-reliability block error rate (BLER) table being used to determine a modulation and coding scheme (MCS) or channel quality indicator (CQI) associated with the data channel.

Aspect 23: The method of any of Aspects 15-22, wherein the tri-state feedback is based at least in part on the one or more communications being associated with a single transport block.

Aspect 24: The method of any of Aspects 15-23, wherein the tri-state feedback is based at least in part on the one or more communications being configured without a code block group (CBG) based shared channel.

Aspect 25: The method of any of Aspects 15-24, wherein the tri-state feedback is based at least in part on the one or more communications including multiple transport blocks or multiple shared channels.

Aspect 26: The method of Aspect 25, wherein the one or more communications is a first communication, and wherein the method further comprises: receiving bi-state feedback based at least in part on a second communication including a single transport block or a single shared channel, wherein the bi-state feedback indicates whether decoding of a data channel of the second communication was successful or unsuccessful.

Aspect 27: The method of any of Aspects 15-26, wherein the tri-state feedback is based at least in part on a codebook generated based at least in part on a plurality of orthogonal sequences, wherein the codebook is generated based at least in part on an exponential expression with base 3.

Aspect 28: The method of Aspect 27, further comprising: processing the tri-state feedback using the codebook based at least in part on converting a set of ternary feedback values to a decimal value and selecting a codeword from the codebook based at least in part on the decimal value.

Aspect 29: The method of any of Aspects 15-28, wherein the one or more communications is transmitted on a code block group (CBG) based data channel including one or more CBGs, and wherein the tri-state feedback includes: a bi-state feedback value for each CBG of the one or more CBGs indicating whether decoding of each CBG was successful or unsuccessful, and a feedback value indicating whether decoding of the control channel was successful or unsuccessful, wherein the control channel is associated with the one or more CBGs.

Aspect 30: The method of Aspect 29, further comprising: mapping the bi-state feedback value and the feedback value to corresponding sequence indices of a plurality of orthogonal sequences of a codebook.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first wireless node, comprising:
a memory; and
one or more processors, coupled to the memory, configured to:
receive one or more communications from a second wireless node, wherein the one or more communications include at least one of:
a first control channel that schedules a data channel, or
the first control channel and the data channel; and
transmit, on a second control channel, tri-state feedback indicating a result of decoding the one or more communications, wherein the tri-state feedback is associated with three potential states, the three potential states indicating whether (i) decoding of the first control channel was unsuccessful, (ii) decoding of the first control channel was successful and decoding of the data channel was unsuccessful, or (iii) decoding of the first control channel and the data channel was successful.

2. The apparatus of claim 1, wherein the one or more processors are further configured to:
transmit capability information indicating that the first wireless node supports the tri-state feedback; and
receive configuration information indicating to provide the tri-state feedback.

3. The apparatus of claim 2, wherein at least one of the capability information or the configuration information is specific to a downlink component carrier (CC).

4. The apparatus of claim 2, wherein at least one of the capability information or the configuration information is specific to the first wireless node.

5. The apparatus of claim 1, wherein transmitting the tri-state feedback is based at least in part on the tri-state feedback being generated using an ultra-reliable low-latency communication (URLLC) feedback codebook.

6. The apparatus of claim 1, wherein transmitting the tri-state feedback is based at least in part on a high-reliability block error rate (BLER) table being used to determine a modulation and coding scheme (MCS) or channel quality indicator (CQI) associated with the data channel.

7. The apparatus of claim 1, wherein transmitting the tri-state feedback is based at least in part on the one or more communications being associated with a single transport block.

8. The apparatus of claim 1, wherein transmitting the tri-state feedback is based at least in part on the one or more communications being configured without a code block group (CBG) based shared channel.

9. The apparatus of claim 1, wherein transmitting the tri-state feedback is based at least in part on the one or more communications including multiple transport blocks or multiple shared channels.

10. The apparatus of claim 9, wherein the one or more communications are a first communication, and wherein the one or more processors are further configured to:
    transmit bi-state feedback based at least in part on a second communication including a single transport block or a single shared channel, wherein the bi-state feedback indicates whether decoding of a data channel of the second communication was successful or unsuccessful.

11. The apparatus of claim 1, wherein the tri-state feedback is generated based at least in part on a codebook generated based at least in part on a plurality of orthogonal sequences, wherein the codebook is generated based at least in part on an exponential expression with base 3.

12. The apparatus of claim 11, wherein the one or more processors are further configured to:
    generate the tri-state feedback using the codebook based at least in part on converting a set of ternary feedback values to a decimal value and selecting a codeword from the codebook based at least in part on the decimal value.

13. The apparatus of claim 1, wherein the one or more communications are received on a code block group (CBG) based data channel including one or more CBGs, and wherein the tri-state feedback includes:
    a bi-state feedback value for each CBG of the one or more CBGs indicating whether decoding of each CBG was successful or unsuccessful, and
    a feedback value indicating whether decoding of the first control channel was successful or unsuccessful, wherein the first control channel is associated with the one or more CBGs.

14. The apparatus of claim 13, wherein the one or more processors are further configured to:
    map the bi-state feedback value and the feedback value to corresponding sequence indices of a plurality of orthogonal sequences of a codebook.

15. An apparatus for wireless communication at a first wireless node, comprising:
    a memory; and
    one or more processors, coupled to the memory, configured to:
    transmit one or more communications to a second wireless node, wherein the one or more communications include at least one of:
        a first control channel that schedules a data channel, or
        the first control channel and the data channel; and
    receive, on a second control channel, tri-state feedback indicating a result of decoding the one or more communications, wherein the tri-state feedback is associated with three potential states, the three potential states indicating whether (i) decoding of the first control channel was unsuccessful, (ii) decoding of the first control channel was successful and decoding of the data channel was unsuccessful, or (iii) decoding of the first control channel and the data channel was successful.

16. The apparatus of claim 15, wherein the one or more communications are a first communication and the tri-state feedback indicates that decoding of the first control channel was unsuccessful, and wherein the one or more processors are further configured to:
    transmit a second communication using a modified control channel configuration relative to the first communication based at least in part on the tri-state feedback indicating that decoding of the first control channel was unsuccessful.

17. The apparatus of claim 16, wherein the modified control channel configuration is based at least in part on feedback indicating that decoding of another control channel, transmitted using the modified control channel configuration, was successful.

18. The apparatus of claim 15, wherein the tri-state feedback is based at least in part on the one or more communications being associated with a single transport block.

19. The apparatus of claim 15, wherein the tri-state feedback is based at least in part on the one or more communications being configured without a code block group (CBG) based shared channel.

20. The apparatus of claim 15, wherein the tri-state feedback is based at least in part on the one or more communications including multiple transport blocks or multiple shared channels.

21. The apparatus of claim 20, wherein the one or more communications are a first communication, and wherein the one or more processors are further configured to:
    receive bi-state feedback based at least in part on a second communication including a single transport block or a single shared channel, wherein the bi-state feedback indicates whether decoding of a data channel of the second communication was successful or unsuccessful.

22. The apparatus of claim 15, wherein the tri-state feedback is based at least in part on a codebook generated based at least in part on a plurality of orthogonal sequences, wherein the codebook is generated based at least in part on an exponential expression with base 3.

23. The apparatus of claim 15, wherein the one or more communications is transmitted on a code block group (CBG) based data channel including one or more CBGs, and wherein the tri-state feedback includes:
    a bi-state feedback value for each CBG of the one or more CBGs indicating whether decoding of each CBG was successful or unsuccessful, and
    a feedback value indicating whether decoding of the first control channel was successful or unsuccessful, wherein the first control channel is associated with the one or more CBGs.

24. A method of wireless communication performed by a first wireless node, comprising:

receiving one or more communications from a second wireless node, wherein the one or more communications include at least one of:
a first control channel that schedules a data channel, or the first control channel and the data channel; and
transmitting, on a second control channel, tri-state feedback indicating a result of decoding the one or more communications, wherein the tri-state feedback is associated with three potential states, the three potential states indicating whether (i) decoding of the first control channel was unsuccessful, (ii) decoding of the first control channel was successful and decoding of the data channel was unsuccessful, or (iii) decoding of the first control channel and the data channel was successful.

25. The method of claim 24, further comprising:
transmitting capability information indicating that the first wireless node supports the tri-state feedback; and
receiving configuration information indicating to provide the tri-state feedback.

26. The method of claim 24, wherein the tri-state feedback is generated based at least in part on a codebook generated based at least in part on a plurality of orthogonal sequences, wherein the codebook is generated based at least in part on an exponential expression with base 3.

27. The method of claim 24, wherein the one or more communications are received on a code block group (CBG) based data channel including one or more CBGs, and wherein the tri-state feedback includes:
a bi-state feedback value for each CBG of the one or more CBGs indicating whether decoding of each CBG was successful or unsuccessful, and
a feedback value indicating whether decoding of the first control channel was successful or unsuccessful, wherein the first control channel is associated with the one or more CBGs.

28. A method of wireless communication performed by a first wireless node, comprising:
transmitting one or more communications to a second wireless node, wherein the one or more communications include at least one of:
a first control channel that schedules a data channel, or the first control channel and the data channel; and
receiving, on a second control channel tri-state feedback indicating a result of decoding the one or more communications, wherein the tri-state feedback is associated with three potential states, the three potential states indicating whether (i) decoding of the first control channel was unsuccessful, (ii) decoding of the first control channel was successful and decoding of the data channel was unsuccessful, or (iii) decoding of the first control channel and the data channel was successful.

29. The method of claim 28, wherein the one or more communications are a first communication and the tri-state feedback indicates that decoding of the first control channel was unsuccessful, and wherein the method further comprises:
transmitting a second communication using a modified control channel configuration relative to the first communication based at least in part on the tri-state feedback indicating that decoding of the first control channel was unsuccessful.

30. The method of claim 29, wherein the modified control channel configuration is based at least in part on feedback indicating that decoding of another control channel, transmitted using the modified control channel configuration, was successful.

* * * * *